(12) United States Patent
Chamberlin

(10) Patent No.: US 8,659,197 B2
(45) Date of Patent: Feb. 25, 2014

(54) ELECTRIC MACHINE ALIGNMENT ADAPTER

(75) Inventor: Bradley D. Chamberlin, Pendleton, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 408 days.

(21) Appl. No.: 13/179,040

(22) Filed: Jul. 8, 2011

(65) Prior Publication Data

US 2012/0013225 A1    Jan. 19, 2012

Related U.S. Application Data

(60) Provisional application No. 61/364,655, filed on Jul. 15, 2010.

(51) Int. Cl.
*H02K 11/00* (2006.01)

(52) U.S. Cl.
USPC .............................. 310/68 B; 310/89; 310/71

(58) Field of Classification Search
USPC ................... 310/68 A–68 E, 68 R, 71, 89, 91
See application file for complete search history.

(56) References Cited

U.S. PATENT DOCUMENTS

| | | | | |
|---|---|---|---|---|
| 4,962,331 A | * | 10/1990 | Smith | 310/216.001 |
| 5,453,649 A | * | 9/1995 | Blanchet | 310/71 |
| 5,763,976 A | * | 6/1998 | Huard | 310/168 |
| 2004/0183386 A1 | * | 9/2004 | Kuwert | 310/89 |
| 2004/0263014 A1 | * | 12/2004 | Miya | 310/168 |
| 2007/0159015 A1 | * | 7/2007 | Lin et al. | 310/71 |

FOREIGN PATENT DOCUMENTS

| | | |
|---|---|---|
| JP | 2005513992 A | 5/2005 |
| JP | 2008182852 A | 8/2008 |
| JP | 2008245385 A | 10/2008 |
| KR | 10-2010-0036790 A | 4/2010 |

OTHER PUBLICATIONS

International Preliminary Report on Patentability for PCT Application No. PCT/US2011/043619, dated Jan. 24, 2013, pp. 1-5.
International Search Report and Written Opinion for corresponding PCT Application No. PCT/US2011/043619, dated Feb. 24, 2012, pp. 1-8.

* cited by examiner

*Primary Examiner* — Tran Nguyen
*Assistant Examiner* — Naishadh Desai
(74) *Attorney, Agent, or Firm* — Cantor Colburn LLP

(57) ABSTRACT

An electric machine including a stator having a body provided with at least one alignment member, and a resolver positioned relative to the stator. The resolver includes at least one alignment element. An alignment adaptor is configured to receive each of the stator and the resolver. The alignment adaptor includes an alignment system that positions the alignment member and the alignment element to establish a desired alignment between the stator and the resolver.

20 Claims, 6 Drawing Sheets

ELECTRIC MACHINE ALIGNMENT ADAPTER

CROSS REFERENCE TO RELATED APPLICATIONS

This application claims the benefit of U.S. Provisional Application No. 61/364,655 filed Jul. 15, 2010 the contents of which are incorporated by reference herein in their entirety.

BACKGROUND OF THE INVENTION

Exemplary embodiments are directed to the art of electric machines and, more particularly, to an alignment adaptor for an electric motor.

Various electric machines employ resolvers to determine degrees or rotation of, for example, a rotor in the electric machine. The degrees of rotation are processed to determine speed and position of the rotor. In general, the resolver includes a stator and is located within a housing portion of the electric machine. The resolver stator is positioned proximate to a stator in the electric machine. It is desirable to establish a particular orientation of the resolver stator relative to the electric machine stator to enhance overall performance.

BRIEF DESCRIPTION OF THE INVENTION

Disclosed is an electric machine including a stator having a body provided with at least one alignment member, and a resolver positioned relative to the stator. The resolver includes at least one alignment element. An alignment adaptor is configured to receive each of the stator and the resolver. The alignment adaptor includes an alignment system that positions the alignment member and the alignment element to establish a desired alignment between the stator and the resolver.

Also disclosed is a method of aligning a resolver and a stator in an electric machine. The method includes inserting a stator into an alignment adapter for the electric machine. The alignment adaptor includes a slot member and a slot element. The method further includes positioning the stator in the alignment adapter, registering an alignment member on the stator with the slot member, mounting a resolver including an alignment element to the alignment adaptor, and registering the alignment element with the slot element to establish a desired alignment of the resolver relative to the stator.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
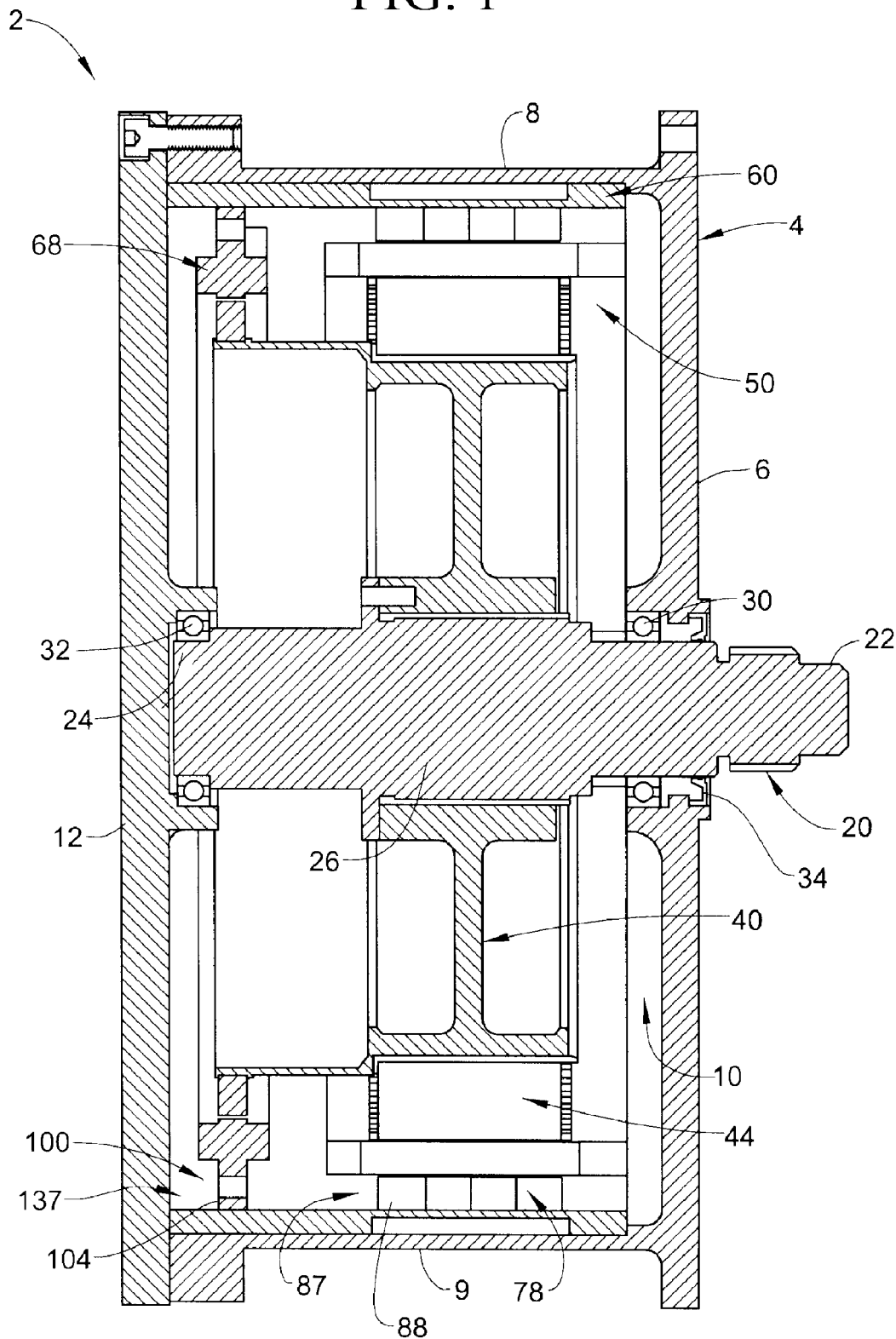
FIG. 1 depicts an electric machine including an alignment adapter in accordance with an exemplary embodiment.
Figure 2:
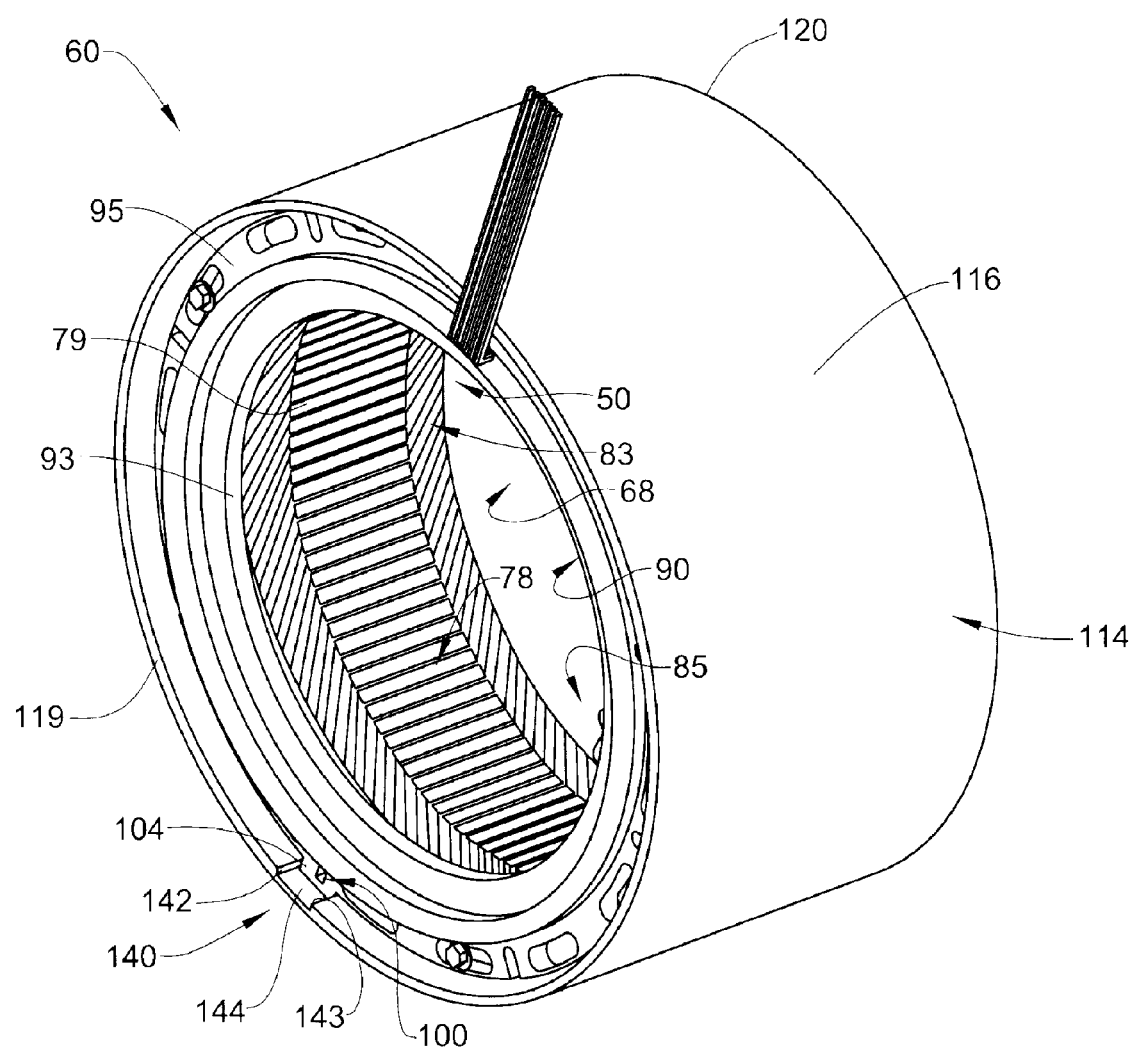
FIG. 2 is an upper right perspective view of the alignment adaptor having installed therein a stator and a resolver.
Figure 3:
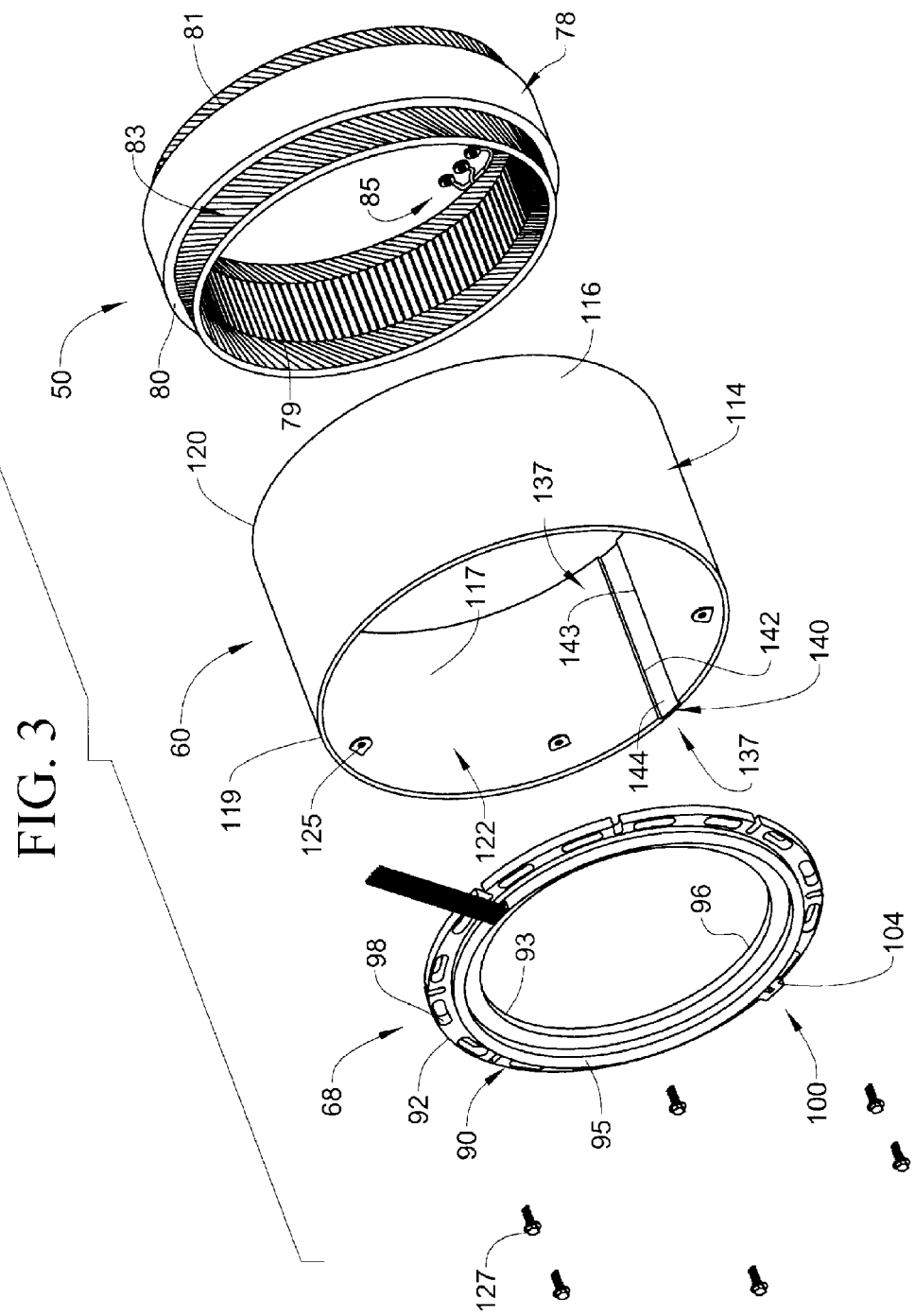
FIG. 3 is an exploded view of the alignment adaptor of FIG. 2.
Figure 4:
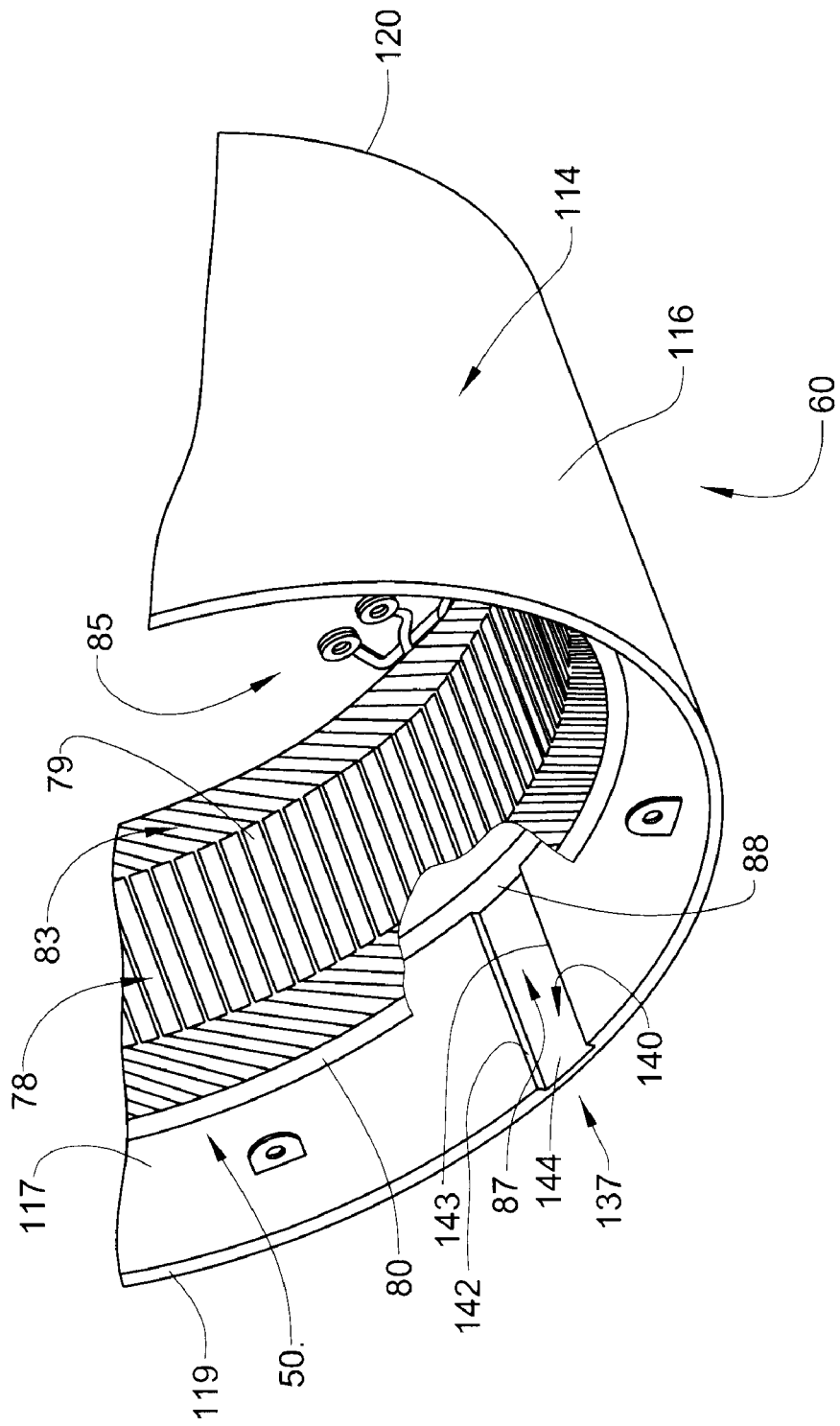
FIG. 4 is a partial perspective for of the alignment adapter illustrating the stator installed.
Figure 5:
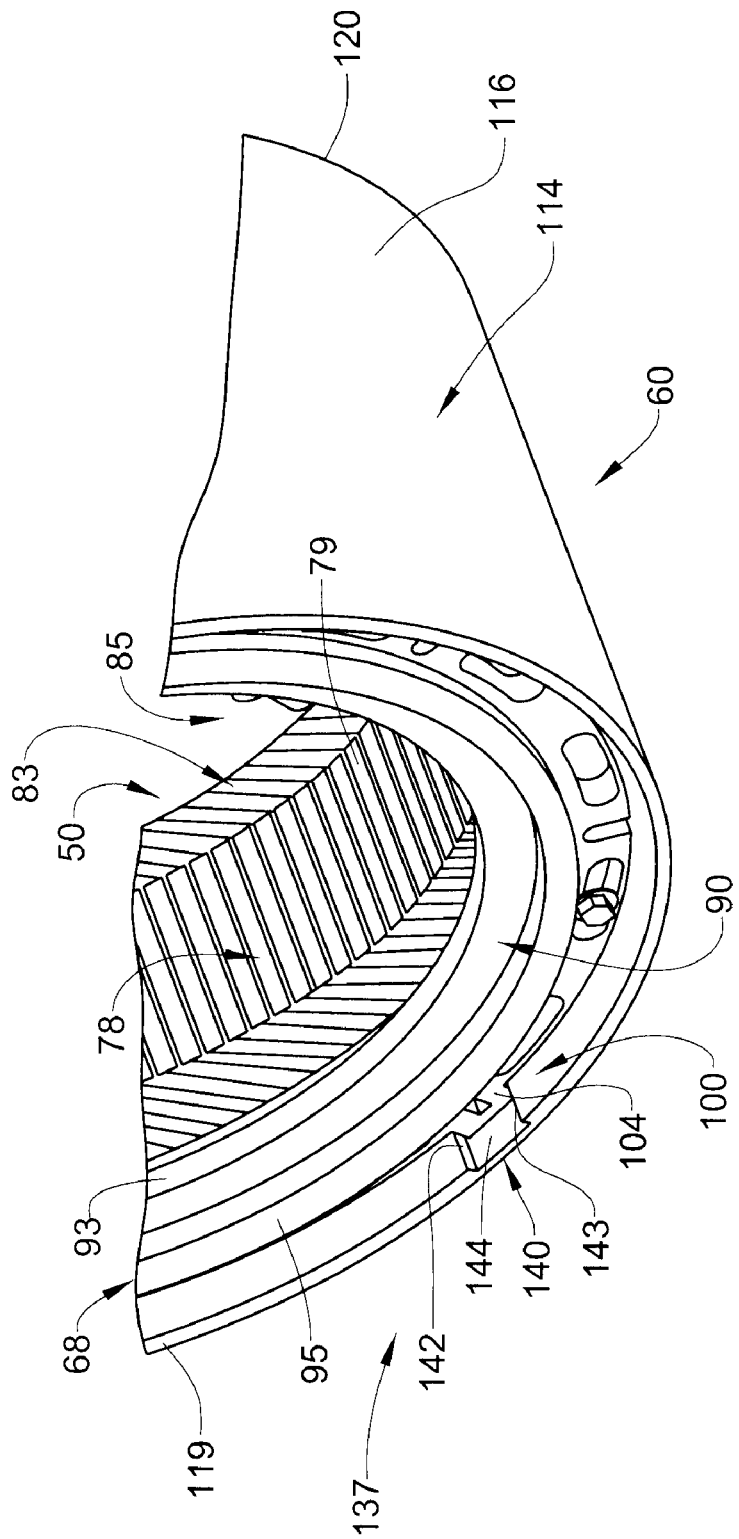
FIG. 5 is a partial perspective for of the alignment adapter illustrating the resolver installed and aligned with the stator.

An electric machine constructed in accordance with an exemplary embodiment is indicated generally at 2 in FIG. 1. Electric machine 2 includes a housing 4 having a first end wall 6 that is joined with first and second opposing side walls 8 and 9 that form an interior portion 10. A second, detachable, end wall 12 is secured to first and second opposing side walls 8 and 9. Second end wall 12 serves as a cover that provides access to interior portion 10. Electric machine 2 includes a shaft 20 having a first end 22 that extends through first end wall 6 to a second end 24 through an intermediate portion 26. First end 22 is rotatably supported relative to first end wall 6 through a first bearing 30 and second end 24 is rotatably supported relative to second end wall 12 through a second bearing 32. A seal 34 extends about first end 22 at first end wall 6. Seal 34 is provided to contain any fluid, such as lubricant and/or coolant, present within interior portion 10. Shaft 20 rotatably supports a hub 40 which, in turn, supports a rotor 44. Rotor 44 rotates relative to a stator 50 that is supported relative to housing 4. In accordance with an exemplary embodiment, electric machine 2 includes an alignment adapter 60 that establishes a particular alignment between stator 50 and a resolver 68.

As best shown in FIGS. 2-5, stator 50 includes a body member 78 formed from a plurality of laminations 79. Body member 78 includes a first outer edge portion 80 and a second outer edge portion 81. Stator 50 also includes a plurality of windings 83 provided in body member 78 that are coupled to a plurality of terminals indicated generally at 85. The number of terminals 85 can vary. In the present exemplary embodiment, electric machine 2 takes the form of a three (3) phase electric motor. Thus, stator 50 is provided with three (3) terminals 85.

In accordance with the exemplary embodiment, stator 50 is provided with an alignment member 87 (FIG. 4) which, as will be discussed more fully below, cooperates with alignment adapter 60. Alignment member 87 takes the form of a tab member 88 formed in the plurality of laminations 79 that establish body member 78. In the exemplary embodiment shown, stator 50 includes a single tab member 88 formed with a rectangular cross-section. However, as will become apparent more fully below, the particular size, number, and shape of alignment member 87 could vary.

In further accordance with the exemplary embodiment, resolver 68 includes a body element 90 having an outer diametric edge 92 and an inner diametric edge 93 that define a first surface 95 and a second, opposing surface 96. Resolver 68 is positioned axially outwardly of stator 50 and includes a plurality of mounting elements 98 that extend through body element 90 near outer diametric edge 92. More specifically, resolver 68 is positioned outwardly relative to windings 83. Mounting elements 98 provide structure to attached resolver 68 to alignment adapter 60 as will be detailed more fully below. Resolver 68 is also shown to include an alignment element 100. In the exemplary embodiment shown, alignment element 100 takes the form of a tab element 104 that extends from outer diametric edge 92. As shown, resolver 68 includes a single tab element 104 having a rectangular cross-section. However, as will become more fully apparent below, the size, number and shape of alignment element 100 could vary in accordance with an exemplary embodiment.

In still further accordance with an exemplary embodiment, alignment adapter 60 includes a body 114 having an outer surface 116 and an inner diametric surface 117 that establish a first edge 119 and an opposing second edge 120 that define an opening 122. Inner diametric surface 117 is provided with a plurality of mounting members, one of which is indicated at 125, that are configured and disposed to align with mounting elements 98 on resolver 68. Mechanical fasteners, one of which is indicated at 127 pass through mounting elements 98 and engage with mounting members 125 to secure resolver 68 to alignment adapter 60. As discussed above, alignment adapter 60 establishes a particular alignment between stator 50 and resolver 68. In this manner, resolver 68 senses a particular position of rotor 44 with a high degree of accuracy. The particular alignment is established by an alignment system 137. In the exemplary embodiment shown, alignment system 60 takes the form of a slot 140 that is formed in inner diametric surface 117 and extends between first and second edges 119 and 120. Slot 140 includes first and second side sections 142 and 143 that are joined by a third side section 144 to establish a generally rectangular cross-section. Of course, it should be understood that slot 140 could take on a variety of other forms and/or shapes. In accordance with the exemplary embodiment, slot 140 is configured and disposed to receive tab member 88 formed on stator 50 and tab element 104 formed in resolver 68. When installed, alignment system 137 establishes a desired alignment between stator 50 and resolver 68.

Figure 6:
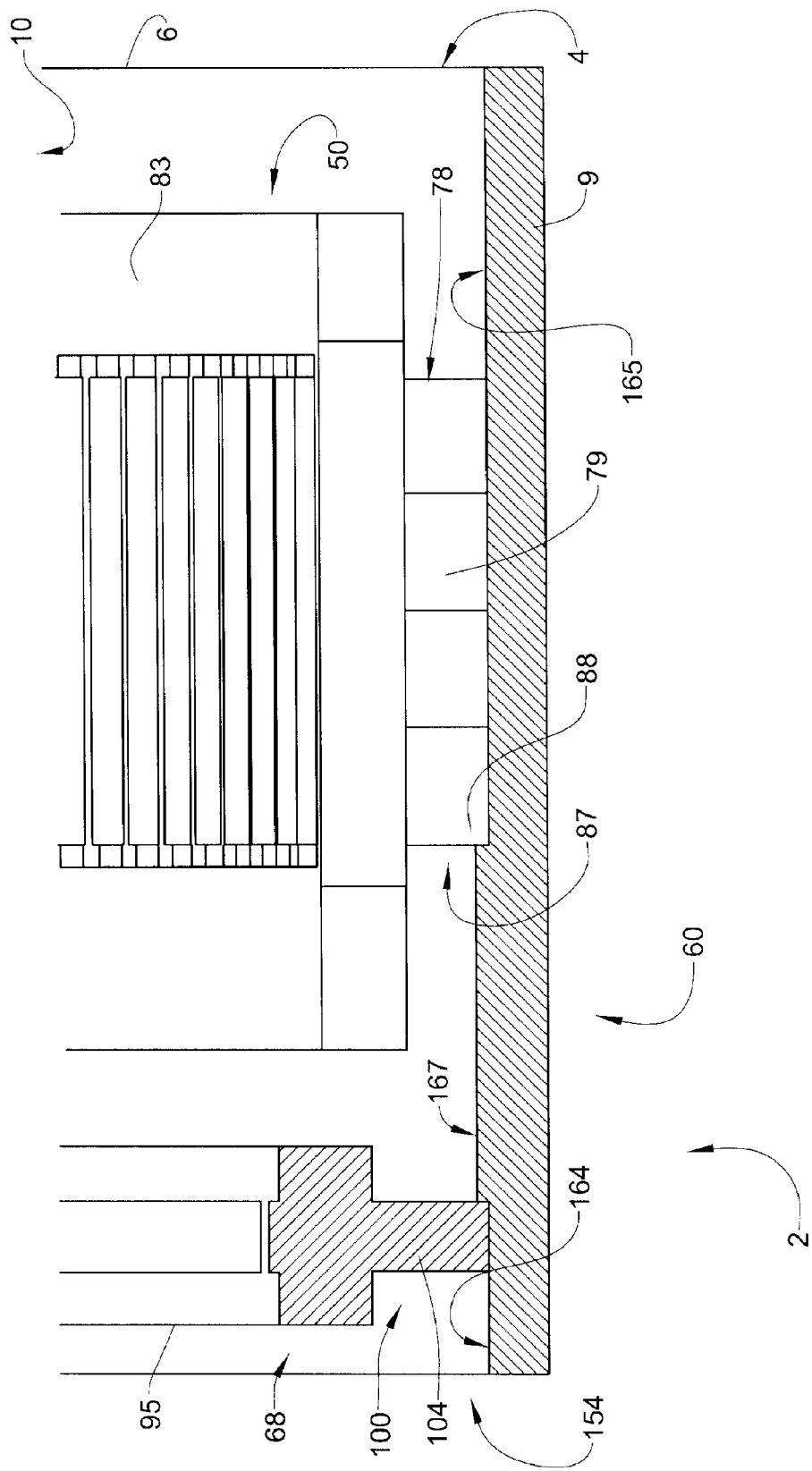
FIG. 6 is a partial cross-sectional view of an electric machine including an alignment adaptor in accordance with another aspect of the exemplary embodiment.

Reference will now be made to FIG. 6, wherein like reference numbers represent corresponding parts in the respective views in describing an alignment system 154 form in accordance with another aspect of the exemplary embodiment. Alignment system 154 includes a first slot portion 164 and a second, distinct slot portion 165 separated from first slot portion 164 by a raised circumferential wall 167. First slot portion 164 extends along inner surface 117 from first edge 119. Second slot portion 165 extends along inner surface 117 from second edge 120. In the exemplary embodiment shown, first slot portion 164 is aligned with second slot portion 165, however it should be understood by one of ordinary skill in the art, that alignment between first and second slot portions 164, 165 is not necessary. First slot portion 164 receives tab element 104 on resolver 68 while second slot portion 165 receives tab member 88 on stator 50. In this manner, alignment system 154 establishes a desired alignment between stator 50 and resolver 68.

At this point it should be understood that the exemplary embodiments provide a device that is incorporated into an electric machine to facilitate a desired alignment between a stator and a resolver to more accurately determine a position of a rotor. As noted above, while the alignment system shown includes a slot having a rectangular cross-section that receives corresponding tab members and tab elements, the particular size, number and shape of the alignment system could vary without departing from the scope of the claims that follow. In addition, the particular form of the tab members and tab elements could vary and should be understood to include structure that ensures a desired alignment between the stator and the resolver within the alignment system.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine comprising:
    a stator including a body member having at least one alignment member;
    a resolver positioned relative to the stator, the resolver including at least one alignment element; and
    an alignment adaptor configured to receive each of the stator and the resolver, the alignment adaptor including an alignment system that positions the alignment member and the alignment element to establish a desired orientation between the stator and the resolver.

2. The electric machine according to claim 1, wherein the alignment adaptor includes a body having an outer surface, an inner surface, a first outer edge, and a second outer edge, each of the first and second outer edges defining an opening configured and disposed to receive the stator and the resolver.

3. The electric machine according to claim 2, wherein the alignment system comprises a slot formed in the body.

4. The electric machine according to claim 3, wherein the slot extends axially across at least a portion of the inner surface of the body.

5. The electric machine according to claim 1, wherein the body member includes a first outer edge portion and a second outer edge portion, the alignment member being exposed at one of the first and second outer edge portions.

6. The electric machine according to claim 1, wherein the stator includes a plurality of laminations, at least a portion of the plurality of laminations defining the alignment member.

7. The electric machine according to claim 6, wherein the alignment member comprises a tab member formed in at least a portion of the plurality of laminations, the tab member being configured and disposed to be received by the slot.

8. The electric machine according to claim 3, wherein the alignment element comprises a tab element configured and disposed to be received by the slot.

9. The electric machine according to claim 3, wherein the slot extends uninterrupted axially across the internal surface of the body.

10. The electric machine according to claim 9, wherein the slot is exposed at one of the first and second outer edges.

11. The electric machine according to claim 3, wherein the slot includes a first slot portion and a second slot portion, the first slot portion being distinct from the second slot portion.

12. The electric machine according to claim 11, wherein the first slot portion is aligned with the second slot portion, the first slot portion being exposed at the first outer edge and the second slot portion being exposed at the second outer edge.

13. The electric machine according to claim 12, wherein the first slot portion is configured to receive the alignment element and the second slot portion is configured to receive the alignment member.

14. The electric machine according to claim 3, wherein the slot is configured and disposed to receive both the alignment member and the alignment element.

15. A method of aligning a resolver and a stator in an electric machine, the method comprising:
    inserting a stator into an alignment adapter for the electric machine, the alignment adaptor including an alignment system;
    positioning the stator in the alignment adapter;
    registering an alignment member on the stator with the alignment system;

mounting a resolver including an alignment element to the alignment adaptor; and registering the alignment element with the alignment system to establish a desired alignment of the resolver relative to the stator.

16. The method of claim 15, wherein registering the alignment member on the stator with the alignment system comprises guiding a tab member on the stator into a slot on the alignment adaptor.

17. The method of claim 15, wherein registering the alignment element with the alignment system comprises guiding a tab element on the resolver into a slot on the alignment adaptor.

18. The method of claim 15, further comprising: aligning the alignment member and the alignment element.

19. An electric machine comprising:

a stator including a body member having at least one alignment member;

a resolver positioned axially outwardly relative to the stator, the resolver including at least one alignment element; and an alignment adaptor configured to receive each of the stator and the resolver, the alignment adaptor including an alignment system that positions the alignment member and the alignment element to establish a desired orientation between the stator and the resolver.

20. The electric machine according to claim 19, wherein the alignment adaptor includes a body having an outer surface, an inner surface, a first outer edge, and a second outer edge, each of the first and second outer edges defining an opening configured and disposed to receive the stator and the resolver.

* * * * *